US012049347B2

(12) United States Patent
Ruschmeier et al.

(10) Patent No.: US 12,049,347 B2
(45) Date of Patent: Jul. 30, 2024

(54) PIERCING CAP AND PIERCER

(71) Applicant: Liqui-Box Corporation, Richmond, VA (US)

(72) Inventors: Matthew Ruschmeier, Glencoe, MN (US); Loren L Brelje, Glencoe, MN (US); Ronald E. Kieras, McHenry, IL (US)

(73) Assignee: Liqui-Box Corporation

( * ) Notice: Subject to any disclaimer, the term of this patent is extended or adjusted under 35 U.S.C. 154(b) by 0 days.

(21) Appl. No.: 18/106,031

(22) Filed: Feb. 6, 2023

(65) Prior Publication Data

US 2023/0182976 A1 Jun. 15, 2023

Related U.S. Application Data

(63) Continuation of application No. 17/512,876, filed on Oct. 28, 2021, now Pat. No. 11,572,224.

(60) Provisional application No. 63/109,149, filed on Nov. 3, 2020.

(51) Int. Cl.

*B65D 51/00* (2006.01)
*B65D 51/22* (2006.01)
(Continued)

(52) U.S. Cl.

CPC ........... *B65D 51/22* (2013.01); *B65D 51/002* (2013.01); *B65D 75/5877* (2013.01); *B67D 1/0004* (2013.01); *B67D 3/0067* (2013.01); *B65D 2251/0025* (2013.01); *B65D 2251/0093* (2013.01); *B67D 2001/0827* (2013.01)

(58) Field of Classification Search

CPC ................ B65D 51/22; B65D 75/5877; B65D 2251/0025; B65D 2251/0093;
(Continued)

(56) References Cited

U.S. PATENT DOCUMENTS 3,966,099 A 6/1976 Sanford, Jr.
4,325,496 A 4/1982 Malpas
(Continued)

FOREIGN PATENT DOCUMENTS

DE 3339257 A1 5/1985
EP 1352843 A1 10/2003

OTHER PUBLICATIONS

PCT, International Search Report for PCT/US2021/057191, dated Mar. 7, 2022 (16 pages).

*Primary Examiner* — Frederick C Nicolas
(74) *Attorney, Agent, or Firm* — MCANDREWS HELD & MALLOY, LTD

(57) ABSTRACT

The present application relates to a system for dispensing fluid. The system includes a flexible container including a spout that is in fluid communication with an interior region of the container. The system includes a cap configured to be mounted to the spout. The cap includes an opening that leads to a membrane and a first retention mechanism located in the opening. The system includes a piercing tube having a first end configured to puncture the membrane and a second end configured to be connected to a dispensing tube. The piercing tube includes a seal bead and a second retention mechanism. The piercing tube is inserted into the opening of the cap such that the first end punctures the membrane, the first and second retention mechanisms engage each other to retain the piercing tube in the cap, and the seal bead sealingly engages the cap.

20 Claims, 19 Drawing Sheets

(51) Int. Cl.

| | |
|---|---|
| ***B65D 75/58*** | (2006.01) |
| ***B67D 1/00*** | (2006.01) |
| ***B67D 3/00*** | (2006.01) |
| *B67D 1/08* | (2006.01) |

(58) Field of Classification Search
CPC .......... B65D 51/002; B67D 2001/0827; B67D 3/0067; B67D 1/0004
See application file for complete search history.

(56) References Cited

U.S. PATENT DOCUMENTS

| | | | | |
|---|---|---|---|---|
| 4,375,864 | A | 3/1983 | Savage | |
| 5,221,267 | A | 6/1993 | Folden | |
| 5,895,383 | A | 4/1999 | Niedospial, Jr. | |
| 5,964,485 | A | 10/1999 | Hame | |
| 6,378,730 | B1 | 4/2002 | Reddy | |
| 7,357,277 | B2 | 4/2008 | Verespej | |
| 7,607,555 | B2 | 10/2009 | Smith | |
| 7,955,318 | B1 | 6/2011 | Schultz | |
| 7,980,424 | B2 | 7/2011 | Johnson | |
| 8,100,879 | B2 | 1/2012 | Blank | |
| 8,425,489 | B2 | 4/2013 | Hofmann | |
| 9,394,089 | B2 | 7/2016 | Silvers | |
| 9,468,739 | B2 | 10/2016 | Sutherland | |
| 9,573,736 | B2 | 2/2017 | Arch | |
| 9,862,531 | B2 | 1/2018 | Johnson | |
| 11,572,224 | B2 * | 2/2023 | Ruschmeier | B67D 3/0067 |
| 2006/0000855 | A1 | 1/2006 | Allen | |
| 2010/0122991 | A1 | 5/2010 | Taguchi | |
| 2011/0031273 | A1 | 2/2011 | Macler | |
| 2012/0035593 | A1 | 2/2012 | Lair | |
| 2015/0060499 | A1 | 3/2015 | Silvers | |
| 2018/0029774 | A1 | 2/2018 | Stever | |

* cited by examiner

PIERCING CAP AND PIERCER

RELATED APPLICATIONS

This application is related to, and claims priority to, U.S. patent application Ser. No. 17/512,876, filed Oct. 28, 2021 and titled "Piercing Cap and Piercer," which in turn is related to, and claims priority to, U.S. Provisional Application No. 63/109,149, filed Nov. 3, 2020, titled "Piercing Cap and Piercer." The complete subject matter and contents of those two applications are incorporated herein by reference in their entirety.

BACKGROUND

Generally, this application relates to systems and methods for facilitating the dispensing of fluids from flexible, collapsible packaging, and in particular, to a piercer and piercing cap system that allows the piercer to pierce the cap such that fluids can be dispensed from packaging to which the cap is connected.

Flexible, collapsible plastic bags are often used to store fluid products such as soft drink syrups, fruit juices, flowable foods, chemicals, hand sanitizer, and soap, among other things. The plastic bags may be housed in a box, housing, or other container to aid in the transporting, handling, and/or dispensing of the product.

The plastic bags in these systems typically have sidewalls sealed along a peripheral seam to define a fluid containing interior chamber. A spout or fitment is typically connected to the bag proximate an opening in the bag and provides access to the fluid chamber for filling the bag with fluid product and dispensing fluid product from the bag. After the flexible container is filled with a desired product, the spout is closed with a cap to seal the flexible container and protect the fluid contents from contamination. Depending on the type of contents, the container, spout, cap, and contents may be heat sterilized using steam, an autoclave process, or similar method. The filled bag may be inserted in a box or other kind of container to make a bag-in-box product. The filled bag is then transported to the end user. The end user may position the bag or bag-in-box in a housing or container. In order to dispense the fluid contents from the bag, the end user connects a dispenser system to the bag at the spout and/or cap to dispense the contents of the bag.

The embodiments of the present technology provide a system and method for dispensing the fluid from a bag.

SUMMARY

Certain embodiments of the present technology relate to a system for dispensing fluid. The system includes a flexible container carrying fluid and including a spout connected thereto. The spout is in fluid communication with an interior region of the container. The system includes a cap configured to be mounted to the spout to seal the spout. The cap includes an opening that leads to a membrane and a first retention mechanism located in the opening. The system includes a piercing tube having a first end that is configured to puncture the membrane and a second end configured to be connected to a dispensing tube. The piercing tube further includes a seal bead and a second retention mechanism. The piercing tube is inserted into the opening of the cap such that the first end punctures the membrane such that fluid can flow from the interior region into the piercing tube, the first and second retention mechanisms engage each other to retain the piercing tube in the cap, and the seal bead engages the cap to form a seal between the cap and the piercing tube.

The membrane may be made of the same material as the cap. The membrane may form a seal around the piercing tube after the piercing tube punctures the membrane. The membrane may be scored.

The cap may have a first bead that engages a lip on a wall of the spout to retain the cap in a pre-capping position with respect to the spout, and the cap may have a second bead that engages the wall of the spout to retain the cap in a final position with respect to the spout. The cap may be made of polyethylene.

The system may further include a connector that connects the piercing tube to the dispensing tube.

The first retention mechanism may be a cavity in an inner wall of the cap and the second retention mechanism may be a shoulder extending out from the piercing tube, wherein when the piercing tube is inserted into the cap, the shoulder is retained in the cavity. The piercing tube may have a flange. The cavity may have a lower wall and an upper wall. The piercing tube flange may abut against an upper wall of the cavity when the shoulder is retained in the cavity.

The piercing tube may include at least one barb at the second end for securing the piercing tube to the dispensing tube. The piercing tube may include a point at the first end. The piercing tube's first end outer diameter may be the same as the second end outer diameter. The piercing tube's first end inner diameter may be the same as the second end inner diameter. The piercing tube point and the seal bead may be made of different materials. The piercing tube point and the second retention element may be made of different materials. The seal bead may be located between the first end and the second retention element.

In other embodiments, the system may include a flexible container carrying fluid and a spout connected thereto. The spout is in fluid communication with an interior region of the container. The system includes a cap configured to be mounted to the spout to seal the spout. The cap includes an opening that leads to a membrane and a first retention mechanism located in the opening as well as a first bead and a second bead. The first bead engages a lip on a wall of the spout to retain the cap in a pre-capping position in the spout. The second bead engages the lip on the wall of the spout in a final position in the spout. The system includes a piercing tube having a first end that is configured to puncture the membrane and a second end configured to be connected to a dispensing tube. The piercing tube further includes a seal bead and a second retention mechanism. The piercing tube is inserted into the opening of the cap such that the first end punctures the membrane such that fluid can flow from the interior region into the piercing tube, the first and second retention mechanisms engage each other to retain the piercing tube in the cap, and the seal bead engages the cap to form a seal between the cap and the piercing tube.

The first retention mechanism may be a cavity in an inner wall of the cap and the second retention mechanism may be a shoulder extending out from the piercing tube, wherein when the piercing tube is inserted into the cap, the shoulder is retained in the cavity. The piercing tube may have a flange. The cavity may have a lower wall and an upper wall. The piercing tube flange may abut against an upper wall of the cavity when the shoulder is retained in the cavity.

In another aspect, this present technology relates to a method for dispensing fluid from a flexible container that is filled with fluid. The method includes providing the flexible container filled with fluid. The method also includes providing a spout, a cap, and a piercing tube. The cap includes an opening, a membrane at the bottom of the opening, and a first retention mechanism. The cap is snapably connected to the spout such that a portion of the cap is inserted into an opening in the spout and seals the spout opening. The piercing tube is inserted within the cap opening a first distance such that a pointed first end of the piercing tube contacts the cap membrane. The first end of the piercing tube is further inserted within the cap opening to a second distance such that the piercing tube punctures the cap membrane, the second retention mechanism engages the first retention mechanism, and fluid flows from the container, through the spout, and through the dispensing tube.

Figure 1:
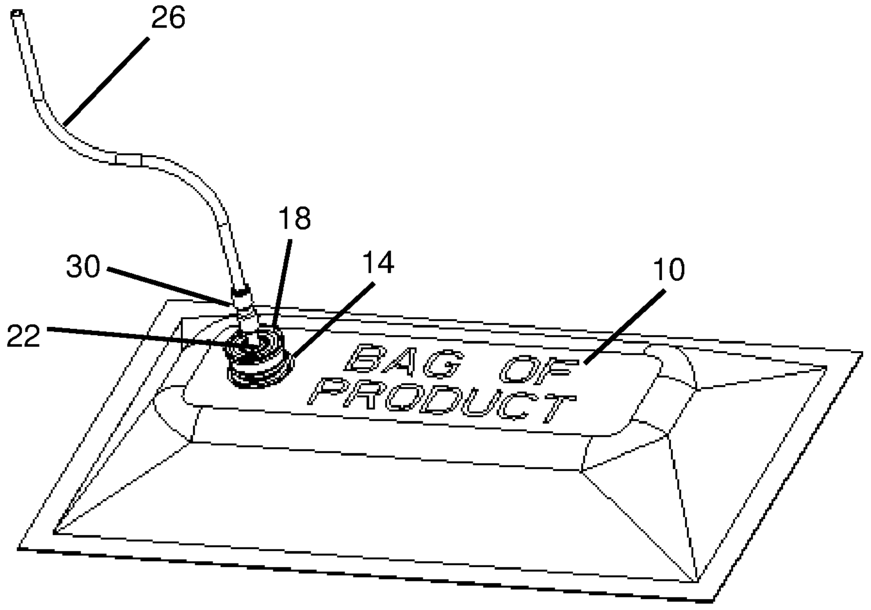
FIG. 1 illustrates an isometric view of the piercer and piercing cap system being used to dispense fluid from a bag in accordance with aspects of this disclosure.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Figure 2:
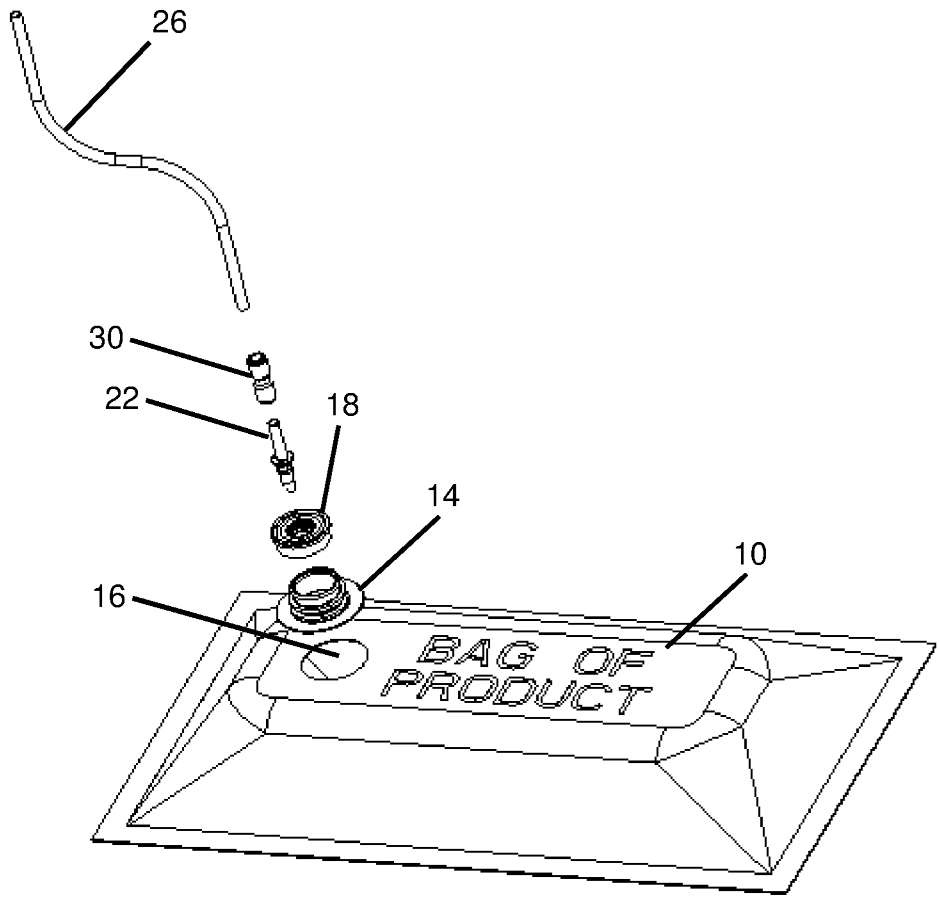
FIG. 2 illustrates an exploded isometric view of the system shown in FIG. 1.
Figure 3:
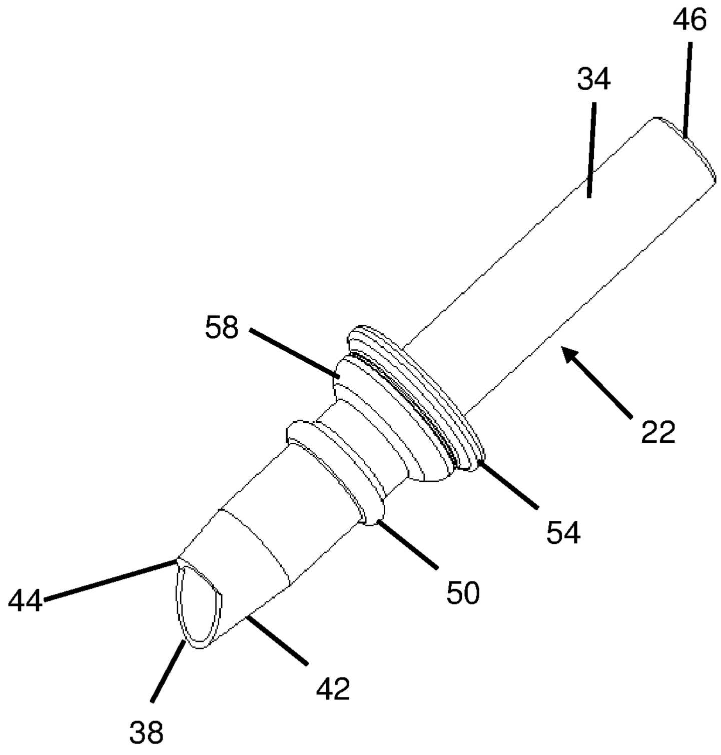
FIG. 3 illustrates a bottom isometric view of the piercer shown in FIG. 1.
Figure 4:
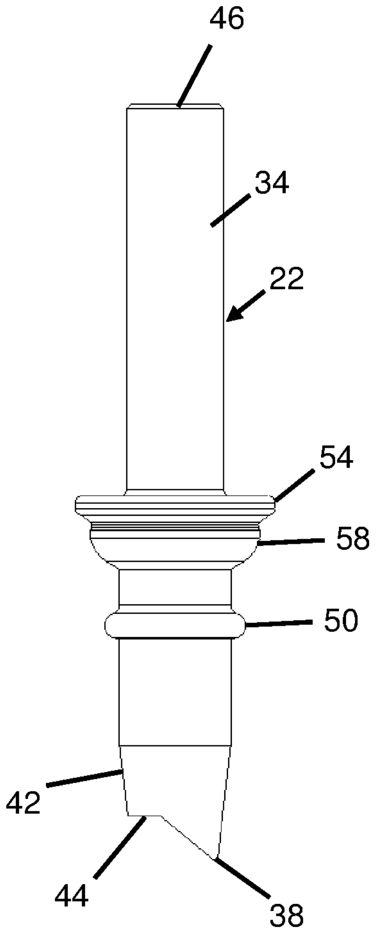
FIG. 4 illustrates a side view of the piercer shown in FIG. 1.
Figure 5:
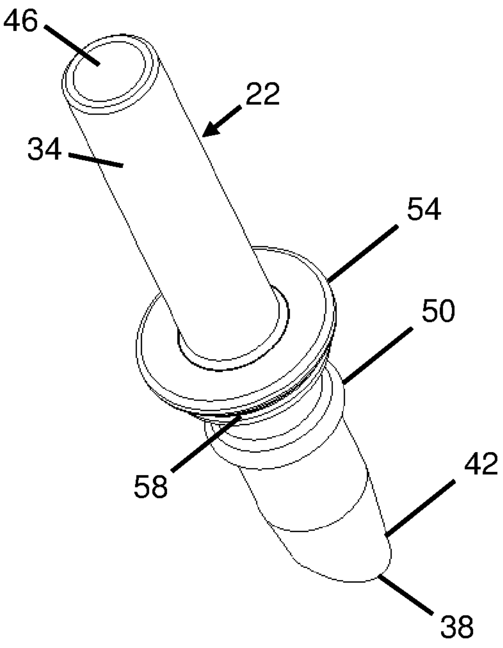
FIG. 5 illustrates a top isometric view of the piercer shown in FIG. 1.
Figure 6:
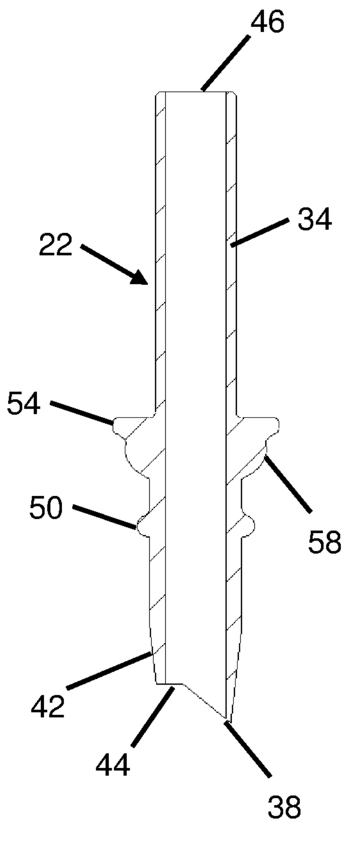
FIG. 6 illustrates a cross-sectional side view of the piercer shown in FIG. 1.

FIGS. 1 and 2 illustrate top isometric views of a piercer and piercing cap system being used to dispense fluid from a bag, pouch, container, or other kind of packaging. The bag 10 may be flexible and collapsible and, in particular, may be made of plastic. The bag 10 has sidewalls sealed along a peripheral seam to define a fluid containing interior chamber. The sidewalls are typically made of polymeric films with either a monolayer or multiple layer structure. The particular polymers constituting the container film layers vary depending on the type of fluid product to be placed in the container. The bag 10 may contain any number of different kinds of fluids or flowable products. The bag 10 may contain, for example, hand sanitizer, soap, chemicals, oils, and may also contain edible products like syrups, juices, and flowable foods. The bag 10 may be any number of sizes. By way of example only, the bag 10 may hold one gallon of fluid or up to five gallons of fluid.

A spout or fitment 14 is connected to bag 10 and is aligned with an opening 16 in the bag 10. The fitment 14 is more rigid than the bag 10 and may be connected to the bag 10 by welding. A piercing cap 18 is connected to the spout 14 of the bag 10. A piercing system engages the cap 18 to evacuate or dispense fluid from the bag 10. The system includes a piercing tube or piercer 22, which is connected to a flexible dispensing hose or tube 26 by a tube connector 30. The dispensing tube 26 is connected to a dispensing mechanism (not shown) that dispenses the fluid. The dispensing tube 26 may be connected to a pump that creates a vacuum to suck fluid out of the bag 10. By way of example only, the bag 10 may be positioned in a housing that is part of a soap or hand sanitizer dispensing station. The dispensing tube 26 may be connected to a pump and dispensing nozzle or faucet that allows for a person to dispense sanitizer from the nozzle or faucet into the person's hands at the station.

FIGS. 3-6 illustrate different views of the piercer 22. The piercer 22 has a hollow tube body 34 and includes a point 38 at an input end 42 thereof and includes an output end 46 configured to engage the tube connector 30 (FIG. 1). The point 38 may be an angled and/or sharp edge extending from the input end 42. The outer diameter of the input end 42 may be tapered towards the point 38. The angled edge of the point 38 may terminate and form a horizontal surface 44. The piercer 22 includes an annular seal bead 50 and flange 54 extending out from the body 34. A curved shoulder 58 extends below the flange 54, and the seal bead 50 is located below the flange 54 and shoulder 58. The piercer 22 may be one piece made of plastic. Alternatively, the piercer body 34 may be made of one type of rigid plastic, and the seal bead 50 and/or shoulder 58 may be made of a more flexible material than the body 34.

Figure 7:
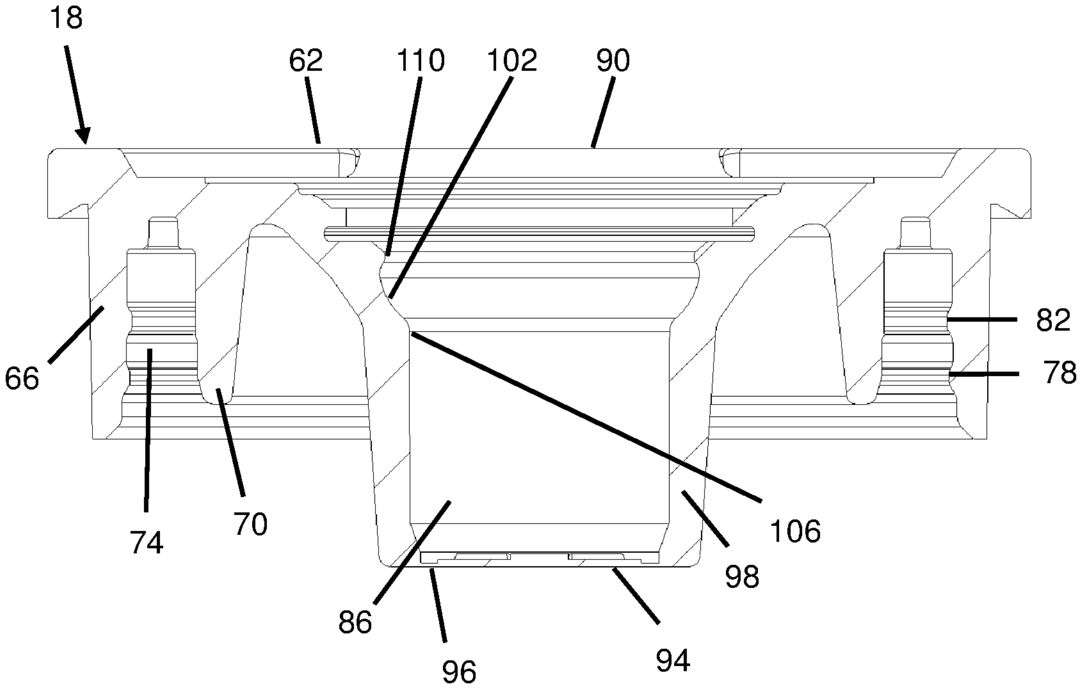
FIG. 7 illustrates a cross-sectional side view of the piercing cap shown in FIG. 1.

FIG. 7 illustrates a cross-sectional side view of the piercing cap 18. The cap 18 may be one piece made of plastic. By way of example only, the cap 18 may be made of polyethylene. The cap 18 includes a top portion 62 from which downwardly extends an outer cylindrical wall 66 and an inner cylindrical wall 70. The walls 66 and 70 define a ring shaped-gap 74 therebetween. The gap 74 is configured to receive the spout 14 (FIG. 1). The outer wall 66 includes a first bead 78 extending inwardly therefrom into the gap 74 and a second bead 82 extending inwardly therefrom into the gap 74. The first bead 78 is positioned below the second bead 82. The first bead 78 assists in locating the cap 18 onto the spout 14 and into a precap position. The second bead 82 assists in locating the cap 18 into a final position on the spout 14. A passage 86 extends from an opening 90 in the top portion 62 of the cap 18 down to a membrane 94 at the bottom of the cap 18. The membrane 94 is thin and may be partly scored. For example, the membrane 94 might include cruciform-shaped partial scoring or a circumferential scoring 96 concentric with the inner wall 98. The passage 86 is at least partly defined by a second inner wall 98. On an inner side, the second inner wall 98 includes an annular cavity 102 extending into the wall 98 and first and second ledges 106 and 110 extending inwardly into the passage 86.

Figure 8:
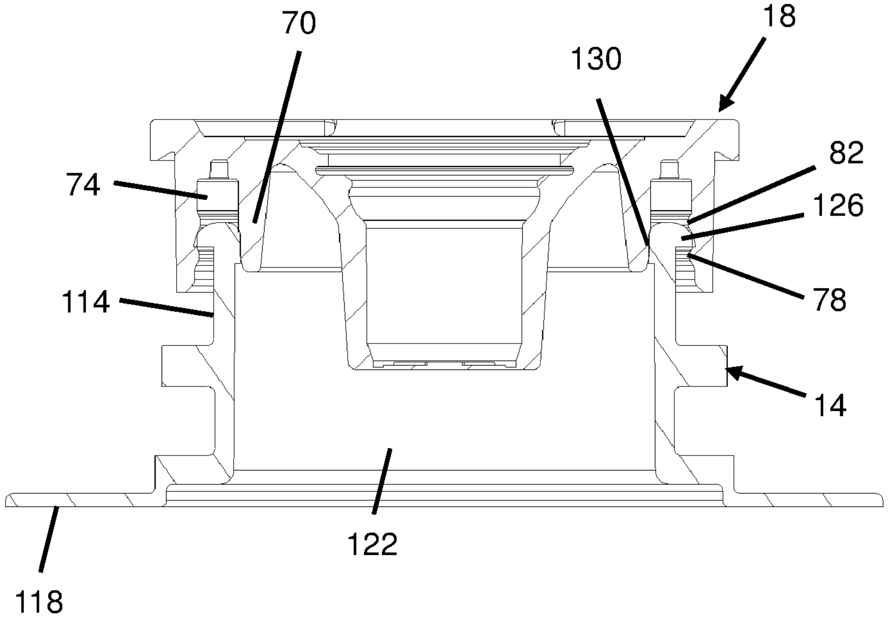
FIG. 8 illustrates a cross-sectional side view of the piercing cap of FIG. 1 mounted to the spout shown in FIG. 1 in a pre-cap position.
Figure 9:
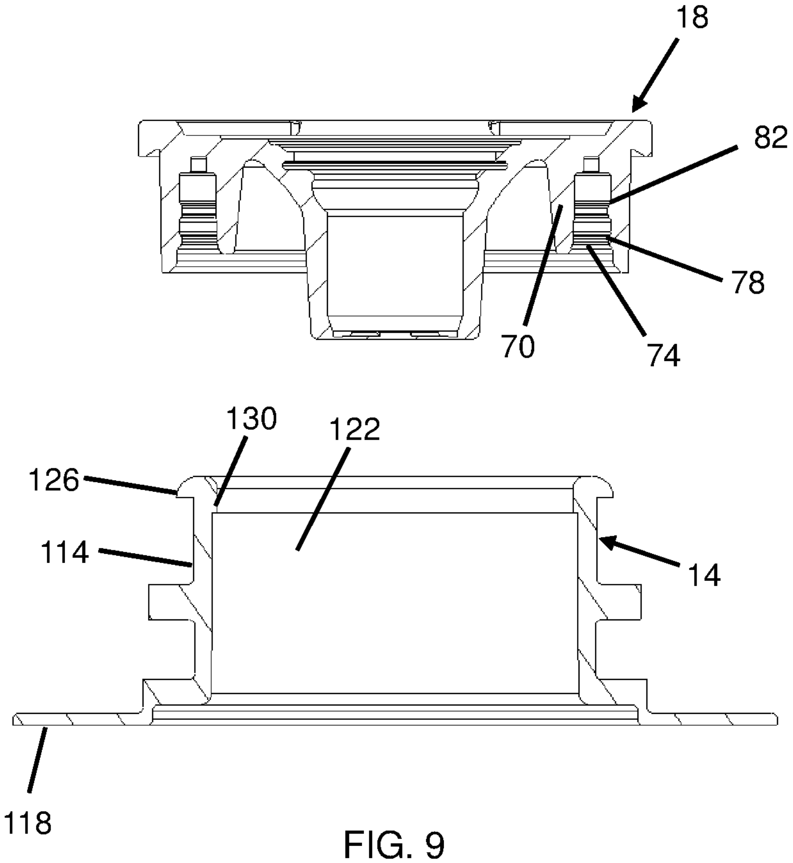
FIG. 9 illustrates a cross-sectional side view of the piercing cap of FIG. 1 removed from the spout shown in FIG. 1.
Figure 10:
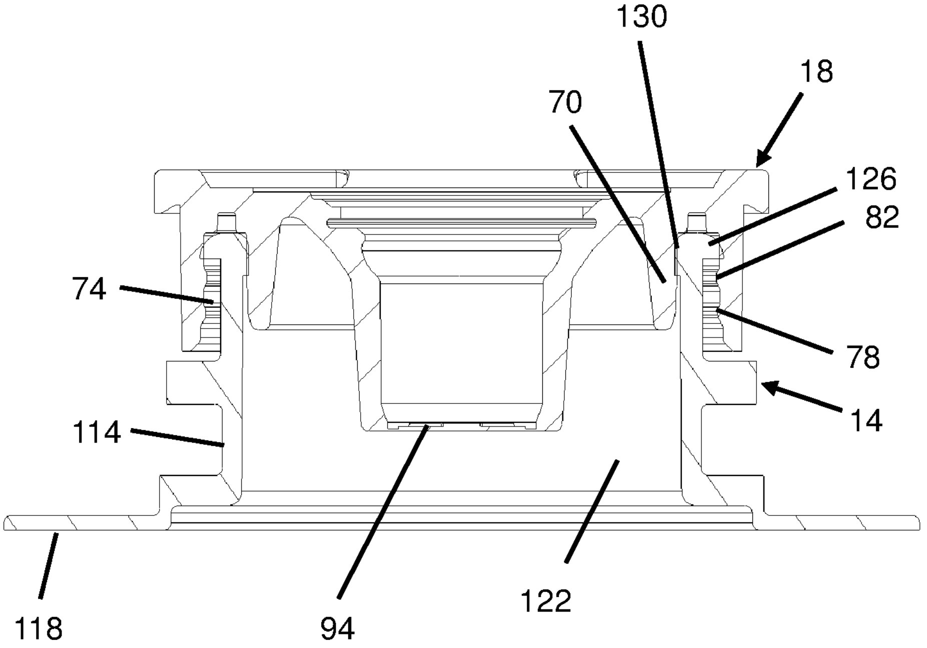
FIG. 10 illustrates a cross-sectional side view of the piercing cap of FIG. 1 mounted to the spout shown in FIG. 1 in a final position.

FIGS. 8-10 show the piercing cap 18 in different positions with respect to the spout 14. FIG. 8 shows the cap 18 mounted to the spout 14 in a pre-capping position. As shown, the spout 14 includes a cylindrical wall 114 extending upwardly from a base flange 118 and defining a fluid passage 122. The spout 14 may be a single, integral piece. The base flange 118 is connected to the bag 10 (FIG. 1) to align the fluid passage 122 with the opening 16 (FIG. 2) in the bag 10. The base flange 118 may be connected to the bag by welding, adhesive, or other methods known in the art. The wall 114 includes a lip 126 extending outwardly along a top end of the wall 114 and a ledge 130 that extends inwardly into the passage 122 proximate the top end of the wall 114. The cap 18 is typically put in the pre-capping position on the spout 14 prior to the bag 14 being transported to a filler that fills the bag with fluid. The cap 18 is put in the pre-capping position by aligning the gap 74 of the cap 18 with the wall 114 of the spout 14 and lowering the cap 18 such that the lip 126 engages and flexibly slides over and above the first bead 78 of the cap 18 but is still located below the second bead 82 of the cap 18. In this way, the cap 18 may be snapably connected to the spout 14. When the lip 126 is located between the first and second beads 78 and 82 of the cap 18, the ledge 130 of the spout 14 engages the lower end of the first inner wall 70, and the cap 18 is held in place with respect to the spout 14 in the pre-capping position. The cap 18 is detachably connected to the spout 14 when it is in the pre-capping position.

When the bag 10 gets to a filler, the filler removes the cap 18 from the spout 14 by pulling the cap 18 upwards with sufficient force that the lip 126 slides downward and back over the first bead 78 of the cap 18. FIG. 9 shows the cap 18 in the removed position with respect to the spout 14. With the cap 18 removed from the spout 14, the filler can fill the bag 10 (FIG. 1) with fluid product through the spout 14. This can be done in an assembly line where the uncapped bag 10 is moved to a station where a filling component engages the spout 14 and dispenses fluid product through the spout 14 into the bag 10 to fill the bag 10.

Once the bag 10 (FIG. 1) is filled with fluid product, the filler seals the spout 14 with the cap 18 so that the filled bag 10 can be shipped to an end user. FIG. 10 shows the cap 18 in a final position where the cap 18 seals the spout 14. The cap 18 is put in the final position by aligning the gap 74 of the cap 18 with the wall 114 of the spout 14 and lowering the cap 18 with enough force such that the lip 126 engages and flexibly slides over and above both the first bead 78 and the second bead 82 of the cap 18. In this way, the cap 18 may be snapably connected to the spout 14. When the lip 126 is located above the second bead 82, the ledge 130 of the spout 14 sealingly engages the first inner wall 70, and the cap 18 is in the final position. The outer diameter of the inner wall 70 is sized to create an interference fit, and thus a seal, with the inner diameter of the spout wall 114. When the cap 18 is in the final position, the cap 18 sealingly engages the spout 14 so that fluid cannot get out and the cap 18 is not easily removed from the spout 14. The membrane 94 prevents fluid from flowing into the passageway 86 (FIG. 7) of the cap 18.

Figure 11:
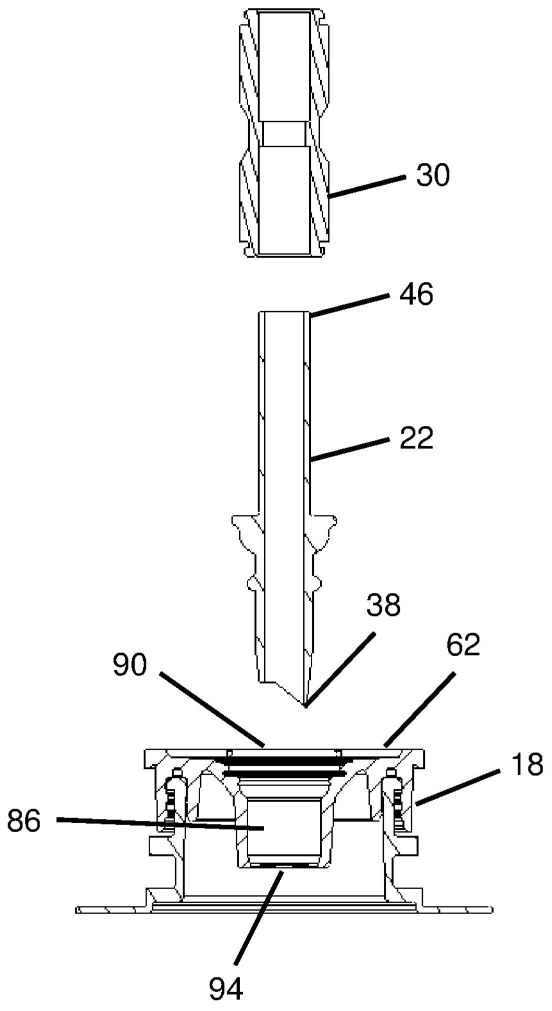
FIG. 11 illustrates a cross-sectional side view of the cap, piercer, and a tube connector shown in FIG. 1 aligned for connection.
Figure 12:
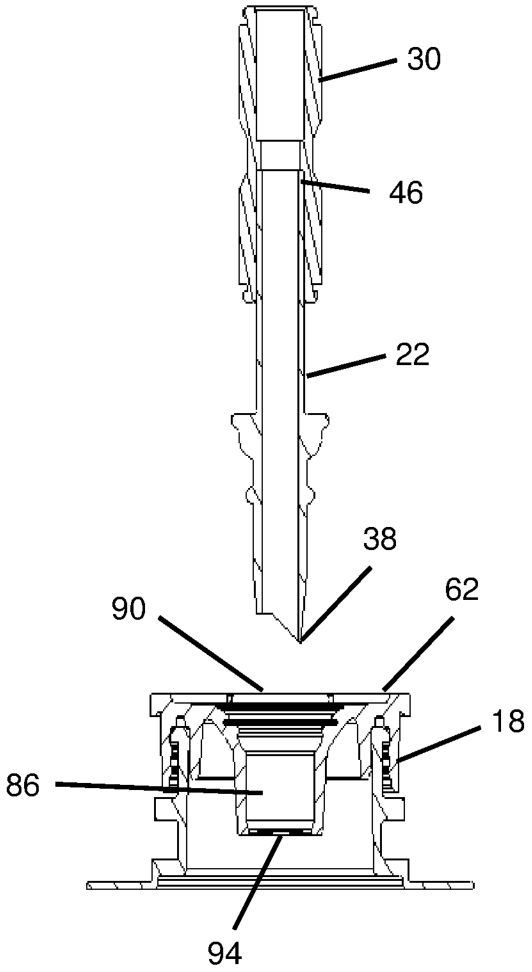
FIG. 12 illustrates a cross-sectional side view of the piercer and tube connector connected and aligned to engage the cap.

When the bag 10 (with the cap 18 in the final position) is shipped to the end user, the end user can use the piercing system shown in FIG. 1 to evacuate the fluid contents from the bag 10 and dispense them. FIGS. 11-15 show how the piercing assembly is used to do so. If the piercer 22 has not already been connected to the dispensing tube 26 (FIG. 1) and the connector 30 as shown in FIG. 11, then the first step is to connect the connector 30 to the piercer 22. As shown in FIGS. 11 and 12, this is done by aligning the output end 46 of the piercer 22 with the connector 30 and inserting the output end 46 into one end of the connector 30. If the other end of the connector 30 is not connected to the tube 26, then the connector 30 can be connected to the tube 26. The output end 46 of the piercer 22 may have the same or similar inner and/or outer diameters as the dispensing tube 26. The connector 30 can be a push-to-connect tube fitting or another kind of connector, adapter, or fitting that can connect two or more tubes to each other. The use of the connector 30 allows the piercer 22 to be connected to a number of different kinds of dispensing tubes 26, including both hard plastic and flexible rubber tubing.

Figure 13:
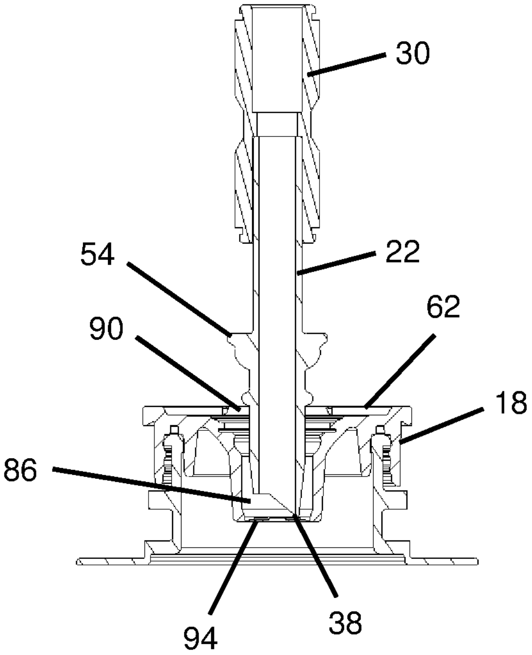
FIG. 13 illustrates a cross-sectional side view of the piercer and tube connector connected and the piercer partly inserted into the cap.
Figure 14:
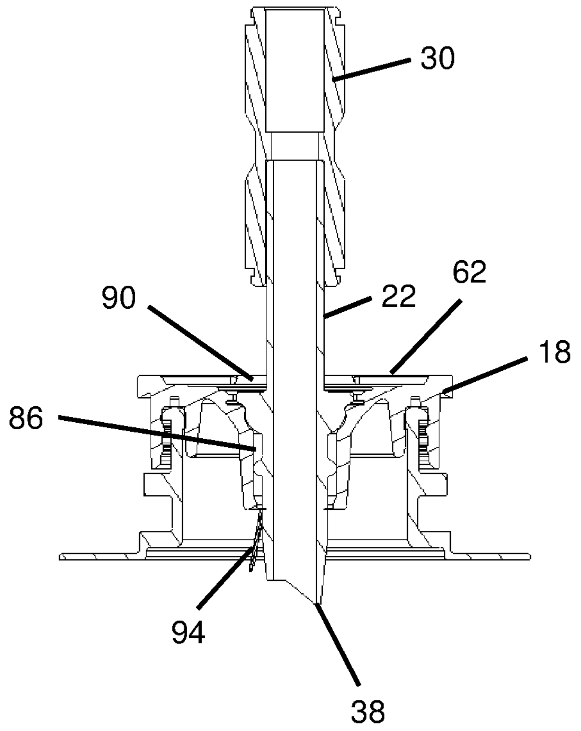
FIG. 14 illustrates a cross-sectional side view of the piercer and tube connector connected and the piercer fully inserted into the cap.
Figure 15:
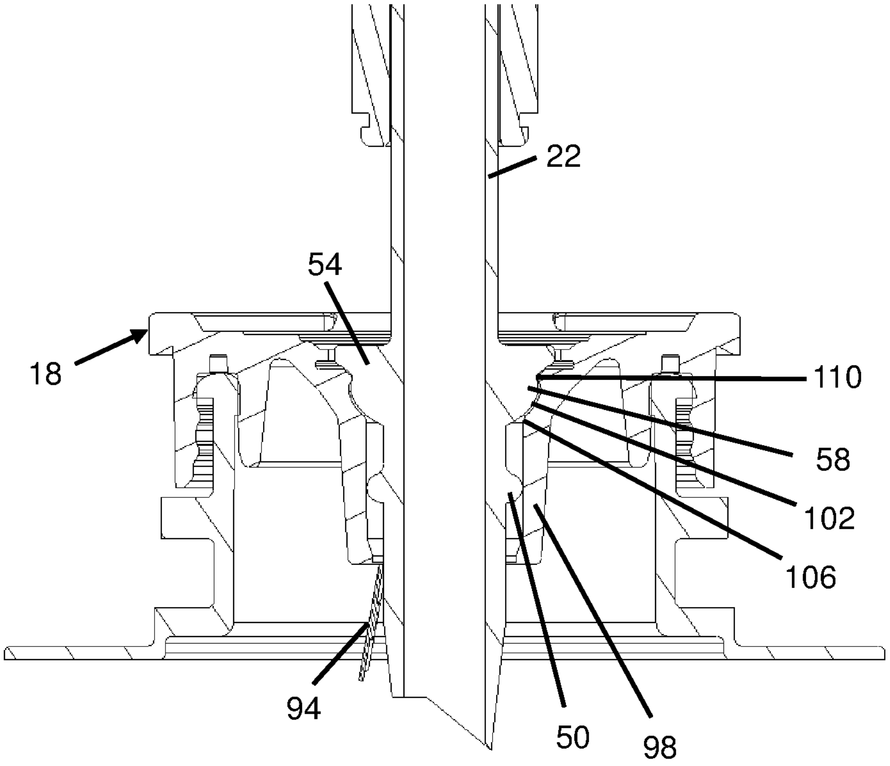
FIG. 15 illustrates an enlarged view of a portion of FIG. 14.

Once the piercer 22 is connected to the connector 30 and tube 26, the user can hold the piercer 22 above the flange 54 with his or her fingers and thumb and align the piercer 22 with the opening 90 in the top portion 62 of the cap 18 and lower the piercer 22 into the passage 86 of the cap 18 until the point 38 of the piercer 22 engages the membrane 94 of the cap 18, as shown in FIG. 13. Because the membrane 94 is thin and may be partially scored along the scored surface 96 (FIG. 7), the user is able to push the point 38 of the piercer 22 through the membrane 94. The user can then continue to move the piercer 22 further into the cap 18 until, as shown in FIGS. 14 and 15, (i) the shoulder 58 of the piercer 22 snapably slides over the second ledge 110 and into the cavity 102 of the cap 18 such that it engages the first ledge 106 of the cap 18, and (ii) the flange 54 of the piercer 22 engages the second ledge 110 of the cap 18. At this point, the piercer 22 is in a final dispensing position where it is retained in the cap 18 by the second ledge 110, it cannot be pushed any further into the cap 18, and the seal bead 50 sealingly engages the second inner wall 98 of the cap 18 to prevent fluid from flowing out of the cap 18 between the second inner wall 98 and the piercer 22. The engagement of the second ledge 110 with the shoulder 58 serves as a locking mechanism to retain the piercer 22 in the cap 18. The seal bead 50 forms a seal by an interference fit with the inner diameter of the wall 98. In addition, the wall 98 may be thin enough at the point where the seal bead 50 engages it such that the wall 98 flexes around the seal bead 50 to form a tight seal. As shown in FIGS. 14 and 15, when the piercer 22 goes through the membrane 94, the membrane 94 does not detach from the cap 18 and go into the fluid contents of the bag 10. Rather, the membrane 94 may become one or more flaps that extend down from the cap 18 and may form a seal around the piercer 22.

In other embodiments, the seal bead 50 may be located closer to the point 38 of the piercer 22 and/or the cap wall 98 may be extended downward such that the seal bead 50 engages the wall 98 prior to the point 38 engaging the cap membrane 94. In yet other embodiments, the dimensions of the spout 14, the piercing cap 18, and the piercer 22 may be adjusted such that the piercer tip 38 remains above the base flange 118 when the piercer is fully inserted into the piercing cap 18 to minimize the risk of the piercer tip 38 puncturing the bag 10.

Figure 16:
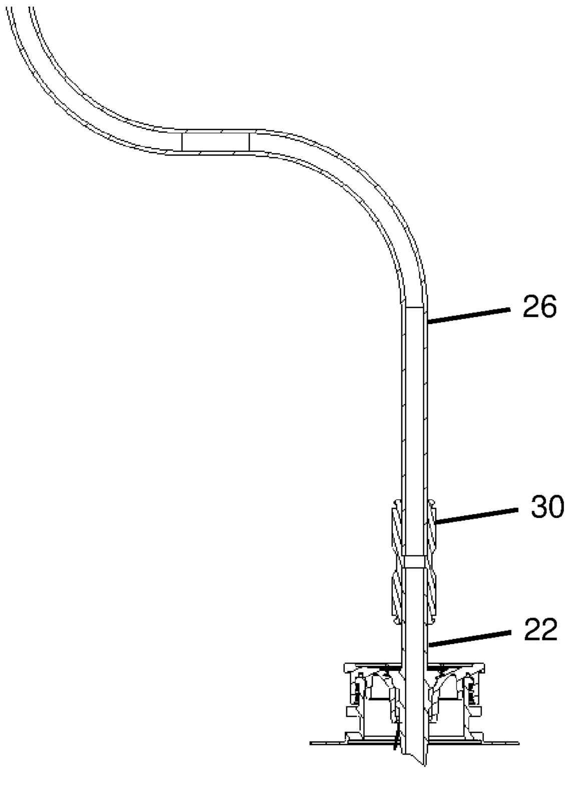
FIG. 16 illustrates a cross-sectional side view of the piercer, tube connector, and the tube interconnected and the piercer fully inserted into the cap.
Figure 17:
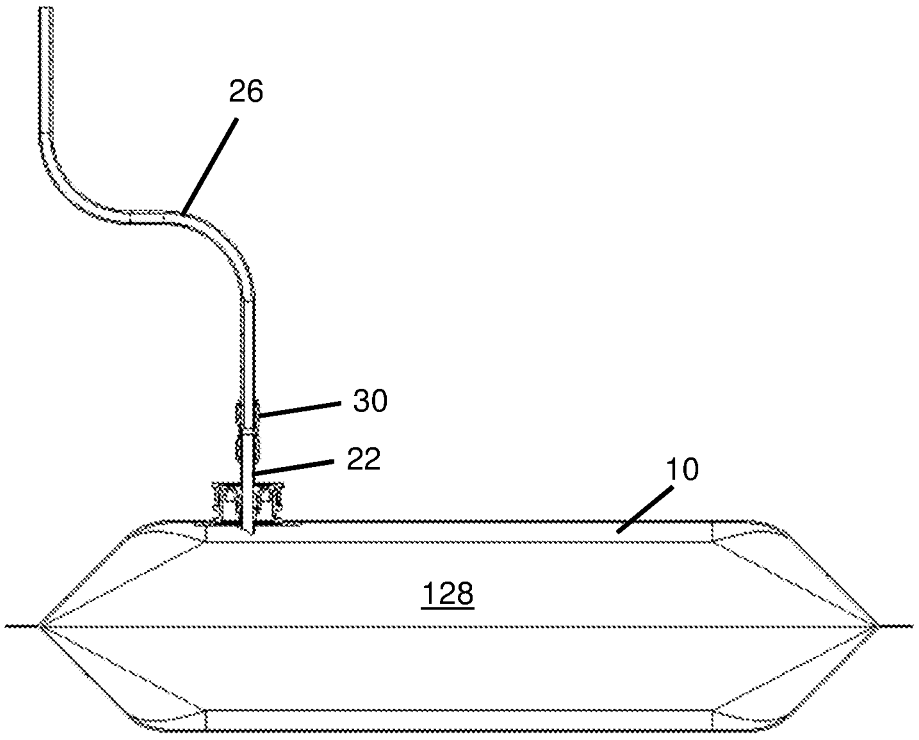
FIG. 17 illustrates a cross-sectional side view of the system of FIG. 1

FIGS. 16 and 17 show cross-sectional side views of the piercer 22 in the final dispensing position and connected to the tube connector 30 and dispensing tube 26. When the piercer 22 is in the final dispensing position, fluid can flow from the bag interior 128 into the piercer 22 and through the connector 30 and the dispensing tube 26 to a dispenser device (not shown). By way of example, the dispensing tube 26 can be connected to a pump that can be used to suck fluid out of the bag 10 via the piercer 22 such that the fluid can be dispensed. For example, the bag 10 could be positioned in a housing at a hand sanitizing or hand soap station and the dispensing tube 26 could be connected to a dispensing pump and nozzle or faucet that allows a user to dispense sanitizer or soap from the bag 10 into the user's hands. The transition between the angled point 38 and the horizontal surface 44 of the input end 42 may help prevent the bag 10 from forming a seal against the piercer 22, thus improving the process of extracting fluid from the bag 10 when the vacuum is applied. When the bag 10 is emptied of its fluid contents, the user can remove the piercer 22 from the cap 18 (by pulling the piercer 22 with enough force to snapably slide the shoulder 58 (FIG. 15) out of the cavity 102 (FIG. 15) and over the second ledge 110 (FIG. 15)) and then dispose of the bag 10 and cap 18. The user can connect the piercer 22 to the cap 18 of a new bag 10 such that fluid product can be dispensed from the new bag 10. If the piercer 22 becomes dull or damaged, it can easily be replaced by detaching the worn piercer 22 from the connector 30 and attaching a new piercer 22 to the connector 30.

Figure 18:
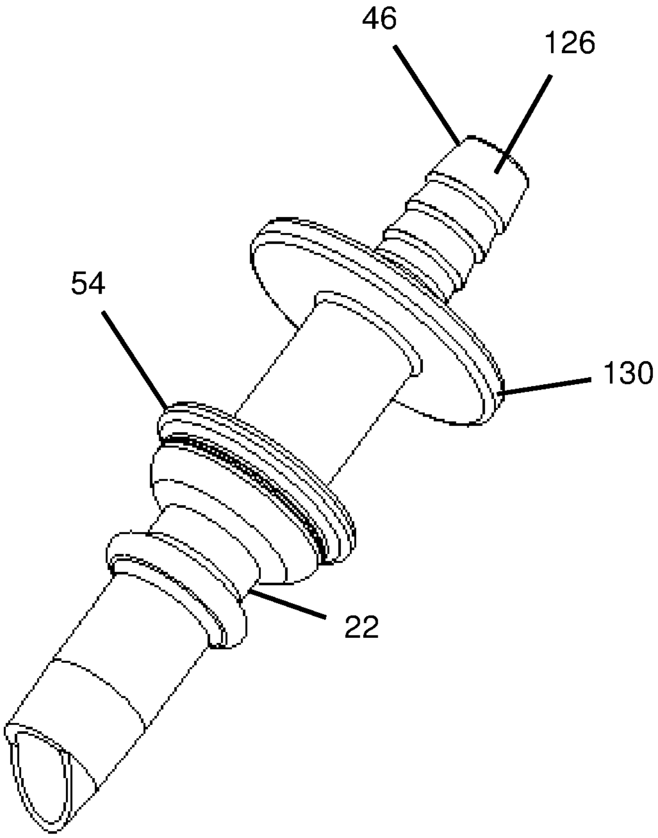
FIG. 18 illustrates an isometric view of piercer in accordance with another aspect of this disclosure.
Figure 19:
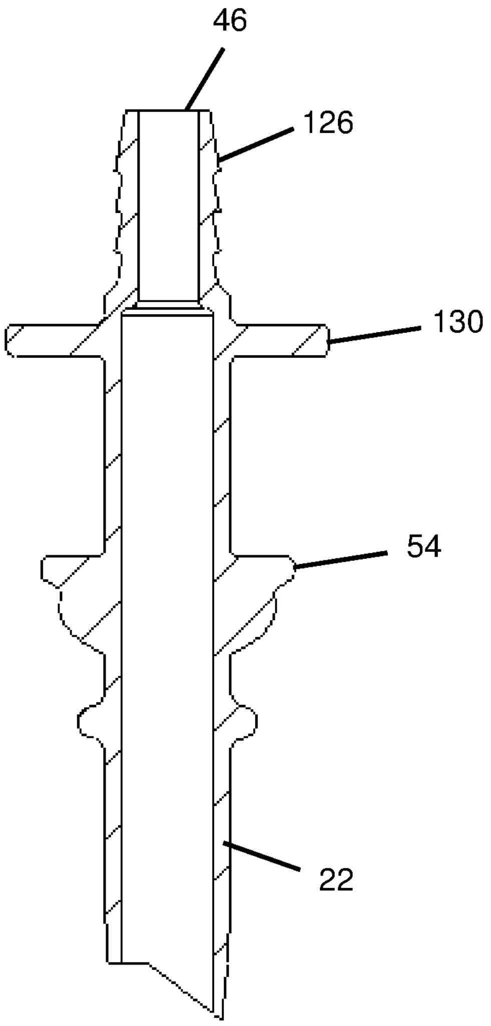
FIG. 19 illustrates a cross-sectional side view of the piercer of FIG. 18.

FIGS. 18 and 19 show an alternative embodiment of the piercer 22. The piercer 22 includes one or more hose barbs 126 at the output end 46. The piercer 22 also includes an upper flange 130 positioned below the barbs 126. The barbs 126 can be used to secure the piercer 22 directly to the dispensing tube 26 (FIG. 17), i.e., a portion of the tube 26 is positioned over the barbs 126, such that the connector 30 (FIG. 17) is not needed to connect the tube 26 and the piercer 22. The use of the barbs 126 allows the piercer 22 to be directly connected to a number of different kinds of dispensing tubes 26. The barbs 126 may provide for connection to larger dispensing tubes 26 than the connector 30 does. The space between the flanges 54 and 130 provides an area for the user to grip the piercer 22 with his or her fingers and thumb. Alternatively, a similar flange 130 of the second embodiment could also be used with the piercer 22 of the first embodiment that uses a connector for similar gripping purposes.

The embodiments disclosed herein provide for a quick and easy connection of a dispenser system to a bag full of fluid product and for easy dispensing of the fluid product. A single piercer can be used with any number of different dispensing tubes connected to dispensing systems and can be used to puncture numerous different bags. Because the piercer is a single molded piece and is quick and easy to use, it provides a low cost way to dispense fluid product from multiple bags. By making the piercing cap and its membrane as a single molded piece made of the same material, the cap is cheap and easy to manufacture. In addition, the ability of the cap to be connected to the spout in a pre-capping position and a final position provides for flexibility in filling, sealing, transporting, and evacuating the bag.

The embodiments disclosed herein are not limited to the specific polymers or materials discussed with respect to those embodiments. Any number of different kinds of polymers having different properties can be used with the embodiments disclosed herein.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A system for dispensing fluid, comprising:
- a cap configured to be mounted to a spout connected to a container holding fluid and to seal the spout, the cap including an opening that leads to a membrane, wherein the opening is defined by a lower wall having a first inner diameter and by an upper wall having a second inner diameter, wherein the second inner diameter is greater than the first inner diameter and wherein a first retention mechanism is located in the upper wall;
- a piercing tube having a first end that is configured to puncture the membrane and a second end configured to be connected to a dispensing tube, the piercing tube further including a seal bead and a second retention mechanism, wherein the piercing tube is inserted into the opening of the cap such that the first end punctures the membrane and that fluid can flow from the interior region into the piercing tube, the first and second retention mechanisms engage each other to retain the piercing tube in the cap, and the seal bead sealingly engages the lower wall.

2. The system of claim 1, wherein the membrane is made of the same material as the cap.

3. The system of claim 1, wherein the membrane forms a seal around the piercing tube after the piercing tube punctures the membrane.

4. The system of claim 1, wherein the cap has a first bead that engages a lip on a wall of the spout to retain the cap in a pre-capping position with respect to the spout, and the cap has a second bead that engages the wall of the spout to retain the cap in a final position with respect to the spout.

5. The system of claim 1, further including a connector that connects the piercing tube to the dispensing tube.

6. The system of claim 1, wherein the first retention mechanism is a cavity and the second retention mechanism is a shoulder, wherein when the piercing tube is inserted into the cap, the shoulder is retained in the cavity.

7. The system of claim 1, wherein the piercing tube includes at least one barb at the second end for securing the piercing tube to the dispensing tube.

8. The system of claim 1, wherein the seal bead is located between the first end and the second retention mechanism.

9. The system of claim 1, wherein the second retention mechanism is a shoulder, and the shoulder has a first outer diameter, the seal bead has a second outer diameter, and the first outer diameter is greater than the second outer diameter.

10. A piercing tube, comprising:
- a body having a first end that is configured to puncture and a second end configured to be connected to a dispensing tube,
- a seal bead, shoulder, and flange extending radially outwardly from the body;

wherein the piercing tube is configured to be inserted into an opening of a cap on a package containing fluid such that (i) the first end punctures a membrane in the cap and fluid can flow from an interior region of the package into the piercing tube, (ii) the shoulder is retained in a cavity in the cap, (iii) the seal bead engages the cap to form a seal between the cap and the piercing tube, and (iii) and the flange abuts against the cap.

11. The piercing tube of claim 10, wherein the shoulder extends downwardly from the flange.

12. The piercing tube of claim 11, wherein the shoulder is located between the flange and the seal bead.

13. The piercing tube of claim 10, wherein the seal bead and shoulder define a gap therebetween along the body.

14. The piercing tube of claim 10, wherein the seal bead has a first outer diameter and the shoulder has a second outer diameter and the second outer diameter is greater than the first outer diameter.

15. The piercing tube of claim 14, wherein the flange has a third outer diameter, and the third outer diameter is greater than the second outer diameter.

16. A cap configured to be mounted to a spout on packaging containing fluid, comprising:

a top portion with an outer skirt wall and an inner skirt wall extending downwardly therefrom to define a channel that is configured to receive the spout;

an opening that extends through the top portion and leads to a membrane, wherein the opening is defined by an inner wall, wherein the inner wall has a lower portion having a first inner diameter and an upper portion having a second inner diameter that is greater than the first inner diameter, the upper portion including a cavity therein; and the cap being configured to receive a piercing tube configured to pierce the membrane and having a shoulder that is received and retained in the cavity and a seal bead that sealingly engages the lower portion of the inner wall.

17. The cap of claim 16, further comprising a first bead that engages a lip on a wall of the spout to retain the cap in a pre-capping position with respect to the spout, and a second bead that engages the wall of the spout to retain the cap in a final position with respect to the spout.

18. The cap of claim 16, wherein the membrane is made of the same material as the cap.

19. The cap of claim 16, wherein the membrane forms a seal around the piercing tube after the piercing tube punctures the membrane.

20. The cap of claim 16, wherein the membrane is scored.

* * * * *